(12) United States Patent
Feldman et al.

(10) Patent No.: US 9,440,373 B2
(45) Date of Patent: Sep. 13, 2016

(54) TRAY ASSEMBLIES AND METHODS FOR MANUFACTURING CERAMIC ARTICLES

(71) Applicant: Corning Incorporated, Corning, NY (US)

(72) Inventors: James Anthony Feldman, Campbell, NY (US); Jacob George, Horseheads, NY (US); Nadezhda Pavlovna Paramonova, Saint-Petersburg (RU); Michael Dean Seymour, Corning, NY (US)

(73) Assignee: Corning Incorporated, Corning, NY (US)

(*) Notice: Subject to any disclaimer, the term of this patent is extended or adjusted under 35 U.S.C. 154(b) by 441 days.

(21) Appl. No.: 13/834,074

(22) Filed: Mar. 15, 2013

(65) Prior Publication Data

US 2013/0221578 A1    Aug. 29, 2013

Related U.S. Application Data

(62) Division of application No. 13/032,028, filed on Feb. 22, 2011, now Pat. No. 8,407,915.

(60) Provisional application No. 61/308,085, filed on Feb. 25, 2010.

(51) Int. Cl.
*B28B 11/24* (2006.01)
*F26B 3/347* (2006.01)
(Continued)

(52) U.S. Cl.
CPC ............... *B28B 11/241* (2013.01); *B28B 3/20* (2013.01); *F26B 3/347* (2013.01); *F26B 15/14* (2013.01); *F26B 2210/02* (2013.01)

(58) Field of Classification Search
CPC ........................................................ B28B 11/241

USPC ........................................................... 264/432
See application file for complete search history.

(56) References Cited

U.S. PATENT DOCUMENTS

| 4,294,624 A | 10/1981 | Veltman |
| 4,764,102 A | 8/1988 | Takahashi |

(Continued)

FOREIGN PATENT DOCUMENTS

| CN | 1268017 | 9/2000 |
| CN | 1417157 | 5/2003 |

(Continued)

OTHER PUBLICATIONS

European Office Action dated Sep. 30, 2015, European Application No. 15163688.3-1605, pp. 1-9, European Patent Office, Munich Germany.

(Continued)

*Primary Examiner* — Alison L Hindenlang
*Assistant Examiner* — Kimberly A Stewart
(74) *Attorney, Agent, or Firm* — Joseph M. Homa

(57) ABSTRACT

Tray assemblies and methods for manufacturing ceramic articles are provided. In one embodiment, a tray assembly includes a tray body having a supporting surface operable to support a ceramic article for passage through a microwave drying apparatus during a microwave drying process and a microwave coupling cover associated with the tray body. The microwave coupling cover envelopes at least a portion of the ceramic article during the microwave drying process. The microwave coupling cover has a dielectric property such that a greater percentage of microwave energy is coupled into the ceramic article with the microwave coupling cover present during the microwave drying process than with the microwave coupling cover not present. Methods may include rotating the ceramic article when the ceramic article is about 40%-60% dry.

10 Claims, 13 Drawing Sheets

(51) Int. Cl.
*F26B 15/14* (2006.01)
*B28B 3/20* (2006.01)

(56) References Cited

U.S. PATENT DOCUMENTS

| | | | |
|---|---|---|---|
| 5,343,024 A | 8/1994 | Prosise et al. | |
| 5,388,345 A | 2/1995 | Brundage et al. | |
| 5,406,058 A | 4/1995 | Lipp | |
| 5,979,073 A * | 11/1999 | Fuls et al. | 34/259 |
| 6,261,406 B1 | 7/2001 | Jurgensen et al. | |
| 6,888,116 B2 | 5/2005 | Dalton | |
| 7,074,302 B2 | 7/2006 | Renck et al. | |
| 7,122,146 B2 | 10/2006 | Akopyan | |
| 7,129,453 B2 | 10/2006 | Dalton | |
| 7,176,427 B2 | 2/2007 | Dalton | |
| 7,351,950 B2 | 4/2008 | Shiraishi | |
| 7,718,445 B2 | 5/2010 | Martin | |
| 7,842,227 B2 | 11/2010 | Kasai et al. | |
| 2003/0090038 A1* | 5/2003 | Ishikawa et al. | 264/432 |
| 2004/0104514 A1* | 6/2004 | Ishikawa et al. | 264/489 |
| 2005/0115101 A1 | 6/2005 | Nate et al. | |
| 2005/0184434 A1 | 8/2005 | Akopyan | |
| 2006/0042116 A1 | 3/2006 | Terazawa et al. | |
| 2008/0023886 A1* | 1/2008 | Adrian et al. | 264/489 |
| 2009/0110829 A1* | 4/2009 | Johnson et al. | 427/256 |
| 2010/0116755 A1 | 5/2010 | Simpson et al. | |
| 2011/0120991 A1 | 5/2011 | Armenta Pitsakis | |
| 2011/0204548 A1 | 8/2011 | George et al. | |
| 2012/0049415 A1 | 3/2012 | George et al. | |

FOREIGN PATENT DOCUMENTS

| | | |
|---|---|---|
| CN | 1438975 | 8/2003 |
| CN | 1874878 | 6/2006 |
| EP | 0 273 707 | 12/1988 |
| JP | 01023010 | 1/1989 |
| JP | 04151204 | 5/1992 |
| JP | 2002143248 | 5/2002 |
| JP | 2007015142 | 1/2007 |
| JP | 2008136485 | 6/2008 |
| WO | 2010/099282 | 9/2010 |

OTHER PUBLICATIONS

Japanese application No. 2012-555052, dated Nov. 18, 2014, "Notification of Grounds for Rejection", 4 pages.

U.S. Appl. No. 13/032,028, dated Dec. 4, 2012, Notice of Allowance and Fee(s) Due, Notice of References Cited by Examiner.

Meredith, Roger, "Engineers' Handbook of Industrial Microwave Heating", IEE Power Series 25, 1998: The Institution of Electrical Engineers, 13 pages.

* cited by examiner

TRAY ASSEMBLIES AND METHODS FOR MANUFACTURING CERAMIC ARTICLES

CROSS REFERENCE TO RELATED APPLICATION

This application is a divisional of U.S. patent application Ser. No. 13/032,028, filed Feb. 22, 2011, which claims priority under 35 U.S.C. §119 of U.S. Provisional Patent Application No. 61/308,085, filed Feb. 25, 2010, the contents of which are incorporated herein by reference in their entirety.

FIELD

The present specification generally relates to drying and manufacturing ceramic articles and, more specifically, to tray assemblies and methods for drying and manufacturing ceramic-forming, or ceramic, articles using microwave radiation.

BACKGROUND

Microwave heating may be utilized to remove moisture from moisture-laden ceramic forming, or ceramic, articles by providing microwave energy directly to the ceramic material being dried. However, fundamental non-uniformity in the exposed electromagnetic fields, resulting from the various modes existing inside of a microwave drying apparatus and inside the ceramic article, may lead to various drying challenges. For example, drying processes utilizing microwave heating may produce unevenly dried ceramic articles placed on microwave drying trays or tray assemblies such that some interior portions of the ceramic article may not be completely dried (i.e., cold regions) and other portions may be over heated (i.e., hot regions).

Accordingly, a need exists for alternative tray assemblies and methods for manufacturing ceramic articles.

SUMMARY

Additional features and advantages will be set forth in the detailed description which follows, and in part will be readily apparent to those skilled in the art from that description or recognized by practicing the embodiments as described herein, including the detailed description which follows the claims, as well as the appended drawings.

Embodiments described herein are generally related to alternative tray assemblies and methods for drying ceramic articles that reduce cold regions in the axial center skin of the ceramic articles. The cold regions may form due to inefficient or non-uniform microwave coupling of the microwave energy during the microwave drying process. Embodiments described herein provide for enhanced microwave energy coupling into the ceramic article to enable more uniform drying within the ceramic article. The term, "ceramic article" is used herein to denote a ceramic-forming article, or a ceramic article, before, during, or after being dried.

In one embodiment, a tray assembly includes a tray body having a supporting surface operable to support a ceramic article for passage through a microwave drying apparatus during a microwave drying process and a microwave coupling cover associated with the tray body. The microwave coupling cover envelopes at least a portion of the ceramic article during the microwave drying process. The microwave coupling cover has a dielectric property such that a greater percentage of microwave energy is coupled into the ceramic article with the microwave coupling cover present during the microwave drying process than with the microwave coupling cover not present.

In another embodiment, a tray assembly includes a tray body and a microwave coupling insert. The tray body has a supporting surface that is operable to support a ceramic article. The microwave coupling insert is located below the supporting surface of the tray body and surrounds at least a portion of the ceramic article. The microwave coupling insert has a dielectric property such that a greater percentage of microwave energy is coupled into the ceramic article with the microwave coupling cover present during a microwave drying process than with the microwave coupling cover not present.

In yet another embodiment, a method of manufacturing a ceramic article includes extruding a wet ceramic material with an extruder apparatus, cutting the extruded wet ceramic material to form a ceramic article, and placing the ceramic article onto a tray body, the tray body associated with a microwave coupling cover configured to cover at least a portion of the ceramic article. The method further includes subjecting the ceramic article to microwave radiation through at least the microwave coupling cover. The microwave coupling cover has a dielectric property such that a greater percentage of microwave energy is coupled into the ceramic article with the microwave coupling cover present than with the microwave coupling cover not present. After the ceramic article is subjected to microwave radiation, the ceramic article may be removed from the tray body when the ceramic article is at a target dryness and the tray body and microwave coupling cover may then be returned to the extruder apparatus.

It is to be understood that both the foregoing general description and the following detailed description present embodiments of the present disclosure, and are intended to provide an overview or framework for understanding the nature and character of the embodiments claimed herein. The accompanying drawings are included to provide a further understanding of the embodiments disclosed herein, and are incorporated into and constitute a part of this specification. The drawings illustrate various embodiments of the present disclosure and together with the description serve to explain the principles and operations of the embodiments described herein.

DETAILED DESCRIPTION

Figure 1:
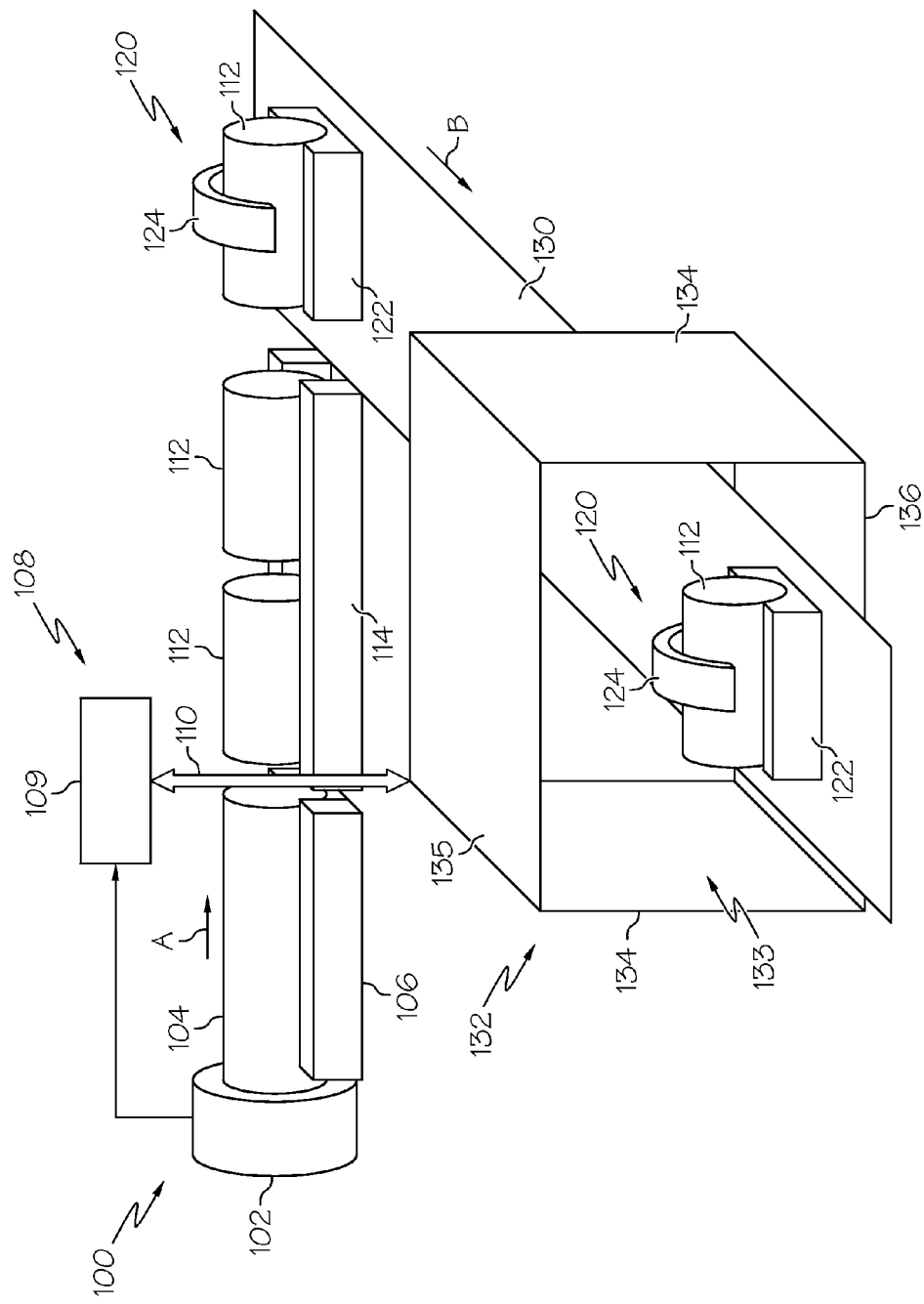
FIG. 1 is a schematic illustration of an exemplary ceramic article manufacturing system according to one or more embodiments shown and described herein.

Reference will now be made in detail to various embodiments for tray assemblies for manufacturing and drying ceramic articles, examples of which are illustrated in the accompanying drawings. Whenever possible, the same reference numerals will be used throughout the drawings to refer to the same or like parts.

As described herein, tray assemblies may generally comprise a tray body and a microwave coupling cover. The microwave coupling cover is operable to increase the coupling of microwave energy provided by a microwave drying apparatus into a ceramic article (e.g., a ceramic honeycomb structure) to efficiently heat and dry the ceramic article. By increasing the level of coupled microwave energy, more uniform drying and shorter drying times may be achieved. Additionally, embodiments described herein provide for the ability to achieve uniform drying with only one drying step rather than two or more (e.g., one microwave drying step and one conventional drying step), as well as the ability to dry multiple-piece ceramic articles.

Referring now to FIG. 1, an exemplary ceramic article manufacturing system 100 is illustrated. The system 100 may generally comprise an extruder apparatus 102, a sawing apparatus 108, a conveyor system 130, and a microwaving drying apparatus 132. It should be understood that embodiments described herein are not limited to the system 100 illustrated in FIG. 1, and that other systems having more or fewer components may be utilized. Extrudate in the form of wet ceramic material 104 may be processed by the extruder apparatus 102 at a desired extrusion rate in a direction indicated by arrow A. The wet ceramic material 104 may be transported toward the sawing apparatus 108 by a first bearing system 106.

The sawing apparatus 108 is operable to cut the wet ceramic material 104 into ceramic articles 112 having a desired length. The sawing apparatus 108 may comprise a controller 109 that receives the velocity of the extrudate as an input and controls a blade 110 at the proper rate to cut the ceramic material 104 into ceramic articles 112 of the desired length. The ceramic articles 112 may be transported toward the conveyor system 130 (e.g., a belt or chain-link conveyor system) on a second bearing system 114. The first and second bearing systems 106, 114 may be air bearing systems to minimize deformation of the wet ceramic material 104 and ceramic articles 112, respectively. Although the system 100 illustrates the use of two bearing systems, embodiments may utilize more or fewer bearing systems. Further, it should be understood that the conveyor system 130 may comprise any suitable system for conveying ceramic articles through the microwave drying apparatus 132. Accordingly, no particular limitation is intended as to the type of conveyor or bearing system used to convey the ceramic material through the ceramic article manufacturing system 100.

Positioned on the conveyor system 130 are one or more tray assemblies 120 operable to receive one or more ceramic articles 112 from the second bearing system 114. As described in more detail below, the tray assembly 120 may comprise a tray body 122 and a microwave coupling cover 124. Depending on the particular embodiment of the tray assembly 120, the microwave coupling cover 124 may be positioned on the tray body 122 after the ceramic article is placed on the tray body 122.

After the ceramic article 112 is maintained on or within the tray assembly 120, the conveyor system 130 then transports the tray assembly 120 toward the microwave drying apparatus 132 in a direction as indicated by arrow B. The microwave drying apparatus 132 may comprise a microwave source (not shown), a microwave chamber 133, and a waveguide assembly (not shown). The microwave chamber 133 generally comprises sidewalls 134, a top 135 and a bottom 136. In one embodiment, the sidewalls 134, top 135, and bottom 136 may be formed from a microwave-impermeable, non-magnetic material that exhibits a high electrical conductivity and resistance to oxidation. Each of the top 135, bottom 136 and sidewalls 134 of the microwave chamber 133 may comprise an inner shell and an outer shell with a layer of insulation (e.g., fiberglass or a comparable insulating material) disposed therebetween. The microwave chamber 133 may be configured such that ceramic articles 112 and tray assemblies 120 pass through the inside of the microwave chamber 133. Although not illustrated, the microwave drying apparatus 132 may further include entrance and exit walls having an opening to allow the tray assemblies 120, ceramic articles 112 and conveyor system 130 to travel into and out of the microwave drying apparatus 132. The openings should be sized such that microwave energy cannot escape the microwave chamber 133. Entry and exit gates (not shown) operable to open and close may also be utilized to prevent microwave energy from escaping. Although the microwave drying apparatus 132 is illustrated as having a single microwave chamber, embodiments may utilize multiple microwave chamber having multiple corresponding microwave sources.

The frequency of the microwave energy generated by the microwave source may vary depending on the particular microwave drying application. In one embodiment, the microwave source is operable to generate microwave energy having frequencies between about 10 MHz to about 100 GHz, and, in some embodiments, frequencies between about 20 MHz to about 6 GHz, or about 900 MHz to about 2.49 GHz. Further, the microwave source (or sources in embodiments having multiple microwave chambers) may be configured to vary the frequency of the microwave energy at different points during the microwave drying process.

Figure 2A:
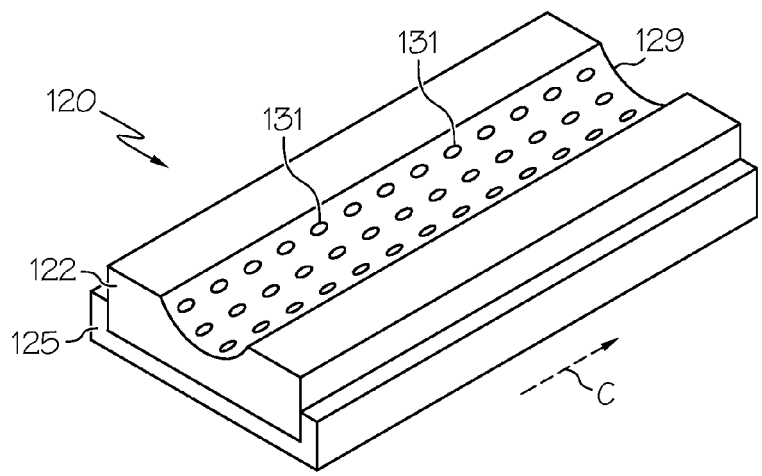
FIG. 2A is a schematic illustration of a perspective view of an exemplary tray body according to one or more embodiments shown and described herein.
Figure 2B:
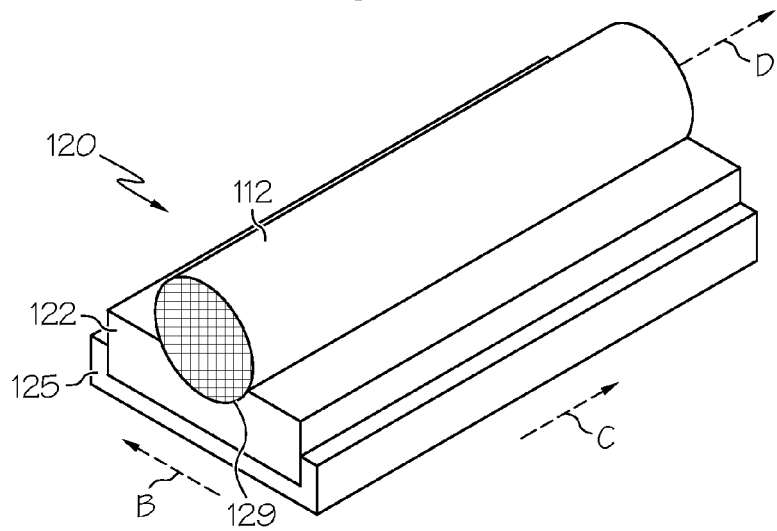
FIG. 2B is a schematic illustration of a perspective view of a ceramic article and an exemplary tray body according to one or more embodiments shown and described herein.
Figure 2C:
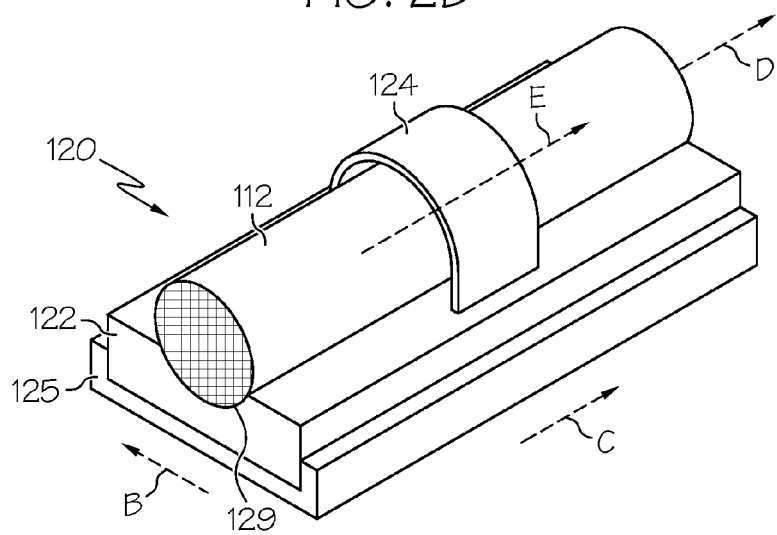
FIG. 2C is a schematic illustration of a perspective view of an exemplary tray body, a ceramic article, and microwave coupling cover according to one or more embodiments shown and described herein.

FIGS. 2A-2C depict a perspective view components of an exemplary tray assembly 120. Referring first to FIG. 2A, the tray assembly 120 includes a tray body 122 having a semi-cylindrical channel 129 having a longitudinal axis running parallel to a tray body longitudinal axis along a lengthwise direction as indicated by arrow C. The tray body 122 may be made of a material that increases in temperature when subjected to microwave radiation. Although the channel 129 is illustrated as having a semi-cylindrical configuration, embodiments are not limited thereto. The channel may be any shape that matches the contour of the ceramic article to be dried. For example, the channel may be rectangular to accept a ceramic article having a rectangular shape. In other embodiments, the shape channel may not match the contour of the ceramic article to be dried.

The channel 129 may also include a plurality of drainage holes 131 that enable liquid within the wet ceramic article to drain out of the tray body 122, as well as enable vapor to escape. The drainage holes may provide for a faster ceramic article drying time. The channel 129 is not limited to the plurality of drainage holes 131 depicted in FIG. 2A as channels may have other configurations that allow liquid and vapor to escape from the tray body. For example, a channel of one embodiment may be configured as a screen having openings through which liquid and vapor may travel. Other configurations are also possible.

In the illustrated embodiment, the tray assembly 120 further comprises an insulator 125 coupled to a bottom portion of the tray body 122. The insulator 125 may be made of a material that is transparent to the applied microwave radiation and also is operable to thermally insulate the tray assembly 120 from the conveyor system during the drying process. The insulator 125 may be made of Lexan or Teflon, for example. It should be understood that other insulating materials may also be utilized.

FIG. 2B illustrates a tray body 122 having a ceramic article 112 placed thereon. The ceramic article 112 depicted in FIG. 2B is configured as a cylindrical ceramic filter. It should be understood that ceramic articles may have other geometric configurations (e.g., rectangular). The ceramic article 112 may be placed on the tray body 122 such that it is positioned within the channel 129 and a ceramic article axis as indicated by arrow D is substantially parallel with the tray body longitudinal axis C. The direction of travel of the tray body 122 (and tray assembly 120) along the conveyor may be along a conveyor travel axis indicated by arrow B, which is normal to the tray body longitudinal axis C (see FIG. 1).

FIG. 2C illustrates a tray assembly 120 having a ceramic article 112 disposed therein. A microwave coupling cover 124 is positioned on the tray body 122 so that the ceramic article 112 is enveloped by the microwave coupling cover 124 from above. A coupler longitudinal axis as indicated by arrow E may be substantially aligned (i.e., common) with the ceramic article longitudinal axis D. The microwave coupling cover 124 illustrated in FIG. 2C has a length that is shorter than the length of the ceramic article 112. As described in more detail below, the length of the microwave coupling cover 124 may vary depending on the particular drying application, and may envelope the ceramic article from the top, bottom and/or sides. Various embodiments of tray assemblies and associated methods will now be described below.

Figure 3A:
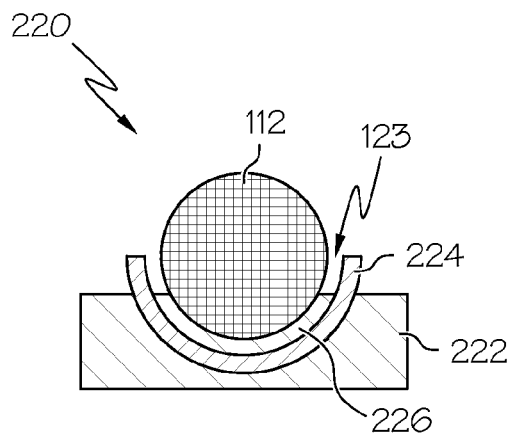
FIGS. 3A-3C are schematic illustrations of a front view, a side view and a front perspective view, respectively, of an exemplary tray assembly and ceramic article according to one or more embodiments shown and described herein.
Figure 3B:
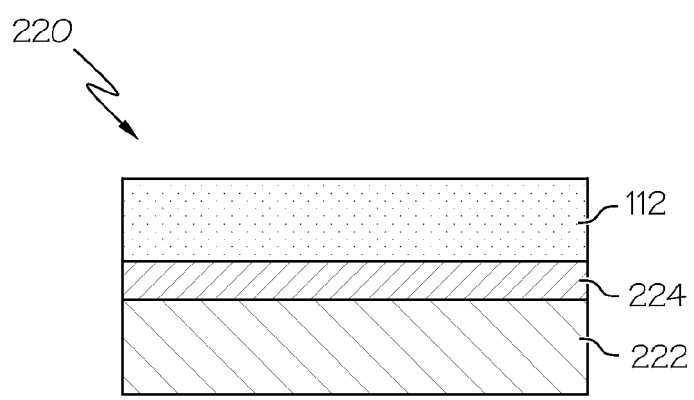
Figure 3C:
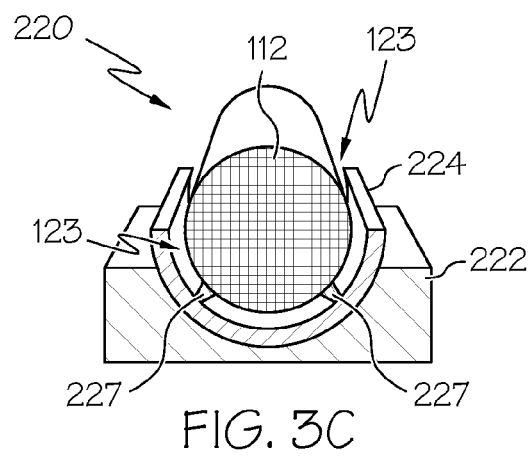

Referring now to FIGS. 3A-3C, an exemplary tray assembly 220 and a ceramic article 112 positioned therein are illustrated in a front view, side view and perspective view, respectively. The tray assembly 220 comprises a semi-cylindrical microwave coupling cover 224 and a tray body 222. Rather than utilizing a microwave coupling cover that is positioned on the tray body such that it encloses the ceramic article from above as illustrated in FIG. 2C, the microwave coupling cover illustrated in FIGS. 3A-C is configured as a microwave coupling insert 224 that is positioned below a supporting surface 226 of a tray body 222. The ceramic article 112 may be supported directly on a semi-cylindrical supporting surface 226 or indirectly by use of optional spacers 227 illustrated in FIG. 4C. In one embodiment, the microwave coupling insert 224 is integral with the tray body 222, while in another embodiment the microwave coupling insert 224 is removable from the tray body 222 such that tray inserts of varying material may be swapped into and out of the tray body 222 as necessary. Embodiments of this configuration may provide the benefit of eliminating the step of removing the microwave coupling cover prior to rotating the ceramic article 180° when the ceramic article is about 40%-60% dry, as described in detail below. Because the microwave coupling insert 224 provides enhanced coupling to at least a portion of a bottom half of the ceramic article 112 rather than the top (e.g., as illustrated in FIG. 2C), easy access to the to the ceramic article is provided. In one embodiment, the ceramic article 112 may be rotated manually or robotically. In another embodiment, rather than rotating the ceramic article 112, the microwave coupling insert 324 may be enabled to automatically and mechanically rotate such that it envelopes at least a portion of a top half of the ceramic article 112 for continued exposure to microwave radiation.

In the illustrated embodiment of FIGS. 3A-3C, the microwave coupling insert 224 envelopes the entire length (longitudinally) of the ceramic article 112 (i.e., an entire portion of a bottom half). However, the length of the microwave coupling cover may be shorter than the length of the ceramic article (see FIGS. 4A-4C, 5A-5C). To provide effective coupling of microwave energy into the ceramic article 112, the length of the microwave coupling cover 224 in some embodiments is greater than or equal to $\lambda_g$, where $\lambda_g$ is the wavelength of the microwave radiation generated by the microwave drying apparatus as it propagates within the ceramic article 112. The thickness of the ceramic article 112 in some embodiments is between about $\lambda_g/8$ and about $\lambda_g/2$ to provide for optimal microwave coupling, as described in more detail below-with reference to FIG. 12.

To enable vapor and air to freely flow from the wet ceramic article 112 during the drying process, the microwave coupling cover 224 may be positioned and configured such that there is a gap 123 between the microwave coupling cover 224 (as well as the tray body material) and the ceramic article 112. This may be achieved by the use of optional spacers 227, for example. To ensure that impedance matching provided by the microwave coupling cover 224 is not compromised, the distance between the ceramic article 112 and the microwave coupling cover 224 should be less than about $\lambda_o/10$, where $\lambda_o$ is the wavelength of the microwave radiation utilized by the microwave drying apparatus as it propagates in air. At this distance, the gap 123 is transparent to the microwave radiation.

The material of the microwave coupling cover should enable the cover to act as a microwave coupler that increases the amount of microwave energy that is coupled into the ceramic article. In other words, the material of the microwave coupling cover provides enhanced impedance matching between air and the ceramic article. In selecting a material for the microwave coupling cover, the dielectric property of the material chosen should be halfway between the dielectric property of air ($\in_O$), which surrounds the ceramic article, and that of a dried ceramic article ($\in_{R2D}$). Considering the dielectric property of a dried ceramic article rather than the dielectric property of a wet ceramic article may aid in reducing overheating of a region of the ceramic article near the surface after it is dry. Dielectric property, as used herein, means a dielectric property having a real component and an imaginary component.

As an example and not a limitation, a material having a real component of a dielectric property of about 8 would be selected for a ceramic article having a dry dielectric property of 15, wherein the dielectric property of air is 1. The imaginary component of the dielectric property of the microwave coupling cover should be virtually zero, as a non-zero value would lead to a heating of the cover (e.g., as a susceptor material would) rather than providing enhanced coupling to the ceramic article. Additionally, a fairly conductive cover would shield the ceramic article from the electromagnetic energy. Therefore, the imaginary component of the dielectric property should be less than about 0.01. As an example and not a limitation, a material having a real component of the dielectric property of about 8 and an imaginary component near zero may be alumina with a porosity of less than about 2% (e.g., an alumina material having a dielectric property of 8.09-j0.008). Because the dielectric property requirements of the microwave coupling cover may be different for different types of ceramic articles, different materials having varying dielectric properties and porosities may be utilized depending on the type of ceramic material being processed. As an example and not a limitation, exemplary materials for the microwave coupling cover may include, but are not limited to, alumina, magnesia, spinel, silicon nitride, and aluminum nitride. Generally, the real component of the dielectric property should be within the range of five to ten for particular ceramic articles.

As described in more detail below, the microwave coupling covers described herein increase the level of microwave energy that is coupled into the ceramic article, which may provide improved-quality ceramic articles (e.g., ceramic articles having wet regions after drying), thereby increasing yield. Additionally, the amount of time necessary to effectively dry the ceramic articles is reduced because less microwave energy is reflected or dissipated, thereby saving energy costs.

Figure 12:
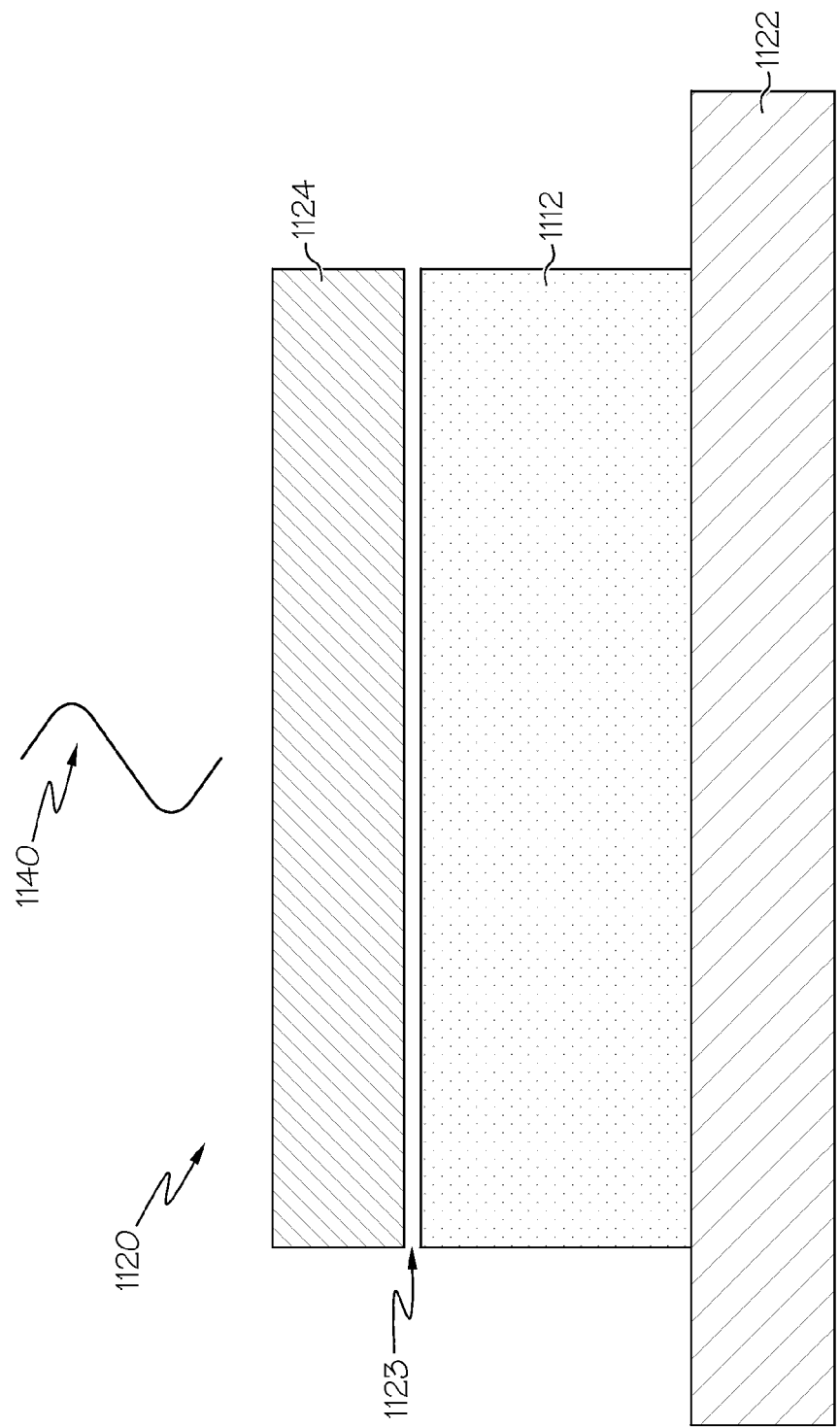
FIG. 12 is a schematic illustration of microwave radiation and microwave coupling cover, ceramic article, and tray body mediums according to one or more embodiments shown and described here.

Referring now to FIG. 12, a schematic illustration of the mediums of a tray body 1122, a ceramic article 1112, a microwave coupling cover 1124, and microwaves 1140 propagating in air is provided. As an example and not a limitation, provided below are electromagnetic properties for the various mediums illustrated in FIG. 12, wherein the microwave coupling cover 1124 is made of alumina with a length (horizontal as shown in FIG. 12) of about four inches, thickness (vertical as shown in FIG. 12) of about one inch, and a gap 1123 of about 0.4 inches. η represents the impedance of the medium, which is the square root of the ratio between the magnetic permeability, $\mu=\mu_0\mu_R$, ($\mu_0$ is the magnetic permeability of free space) and the dielectric permittivity, $\in=\in_0\in_R$, ($\in_0$ is the dielectric permittivity of free space):

$$\eta = \sqrt{\frac{\mu}{\varepsilon}}, \Omega, \qquad \text{Eq. (1).}$$

The subscripts 0, 1, 2, and 3 represent mediums of air, the microwave coupling cover, ceramic article, and tray body, respectively. In addition, subscripts "D" and "W" represent the dry and wet state of the ceramic article. The reflection coefficient Γ uses subscripts to indicate the interface between two mediums. For example, $\Gamma_{01}$ means the interface between air and the microwave coupling cover. The above electromagnetic properties may be further defined by:

$$\eta_{xy} = \frac{\eta_y}{\eta_x}, \qquad \text{Eq. (2);}$$

$$\Gamma_{xy} = \frac{\eta_{xy}-1}{\eta_{xy}-1}, \qquad \text{Eq. (3);}$$

$$\mu_0 = 4\pi \times 10^{-7}, Hm^{-1};$$

and $$\varepsilon_0 = 8.854 \times 10^{-12}, Fm^{-1}.$$

The following electromagnetic properties are provided below as an example for illustrative purposes only. Embodiments described herein are not limited to the following electromagnetic properties in any way. In this example, the microwave coupling cover comprises an alumina material. The exemplary properties are as follows:

Air: $\in_0$, $\mu_0$, $\eta_0$=377 Ω, $\Gamma_{01}$=−0.5, $\Gamma_{02D}$=−0.59, and $\Gamma_{02W}$=−0.75;

Microwave coupling cover: $\in_{R1}$=9, $\mu_{R1}$=1, $\eta_1$=126 Ω, $\Gamma_{12D}$=−0.13, $\Gamma_{12W}$=−0.41;

Dry ceramic article: $\in_{R2D}$=15, $\mu_{R2D}$=1, $\eta_{2D}$=97 Ω, $\Gamma_{2D3}$=0.52;

Wet ceramic article: $\in_{R2W}$=50, $\mu_{R2W}$=1, $\eta_{2Dw}$=53 Ω, $\Gamma_{2W3}$=0.52; and Tray body: $\in_{R3}$=1.5, $\mu_{R3}$=1, $\eta_3$=307 Ω, $\Gamma_{30}$=0.19.

The reflection coefficients provided above show that the alumina microwave coupling cover provides enhanced impedance matching for oncoming electromagnetic waves, which in turn, results in enhanced efficiency and heating of the middle skin region of the ceramic article (i.e. the middle portion at the outermost periphery of the ceramic article). The following two examples further illustrate the enhanced coupling effect provided by a microwave coupling cover having the above properties.

Example 1

Dry Ceramic Article

Nearing End of Drying Process

Assuming an input power of 100 W for the oncoming electromagnetic waves directed toward the ceramic article and tray assembly, an alumina microwave coupling cover having a reflectivity coefficient $\Gamma_{01}$=−0.5 will reflect 40% of the power such that 50 W will be coupled into the alumina microwave coupling cover. Out of this 50 W, 87% gets coupled directly into the ceramic article (50 W*(1−$\Gamma_{12}$)= 43.5 W). By following a similar analysis, one may see that only 41% of the input power gets directly coupled into the ceramic article in the absence of the microwave coupling cover 124 (100 W*(1-$\Gamma_{02}$)=41 W). Therefore, the power coupled into the ceramic article is lower when the microwave coupling cover is not present. The accumulated effect of this advantage over the drying time of approximately 20 minutes, which may include passage through a microwave drying apparatus having plurality of 100 W microwave applicators, is significant.

Example 2

Wet Ceramic Article

At Beginning of Drying Process

As in the above example, the microwave drying apparatus is configured to propagate 100 W of electromagnetic radiation toward the ceramic article. With an alumina microwave coupling cover having the above properties present in the tray assembly, approximately 40% (50 W) of the 100 W will be coupled into the alumina microwave coupling cover. Out of this 50 W, 59% couples directly into the ceramic article (50 W*(1-$\Gamma_{12}$)=29.5 W). By following a similar analysis, it is shown that only 25% of the 100 W of input power is directly coupled into the ceramic article in the absence of the alumina microwave coupling cover. Therefore, there is an approximate advantage of about 4.5% with the microwave coupling cover present than not present. Again, the accumulated effect of this advantage over the drying time of approximately 20 minutes through several 100 W microwave applicators is significant.

As described above with reference to the two examples, the microwave coupling cover increases the percentage of microwave energy that is coupled into a ceramic article. This increased coupling enables shorter drying times and a more enhanced drying of cold region without the need for additional drying furnaces, such as a convection drying furnace, for example.

Figure 13:
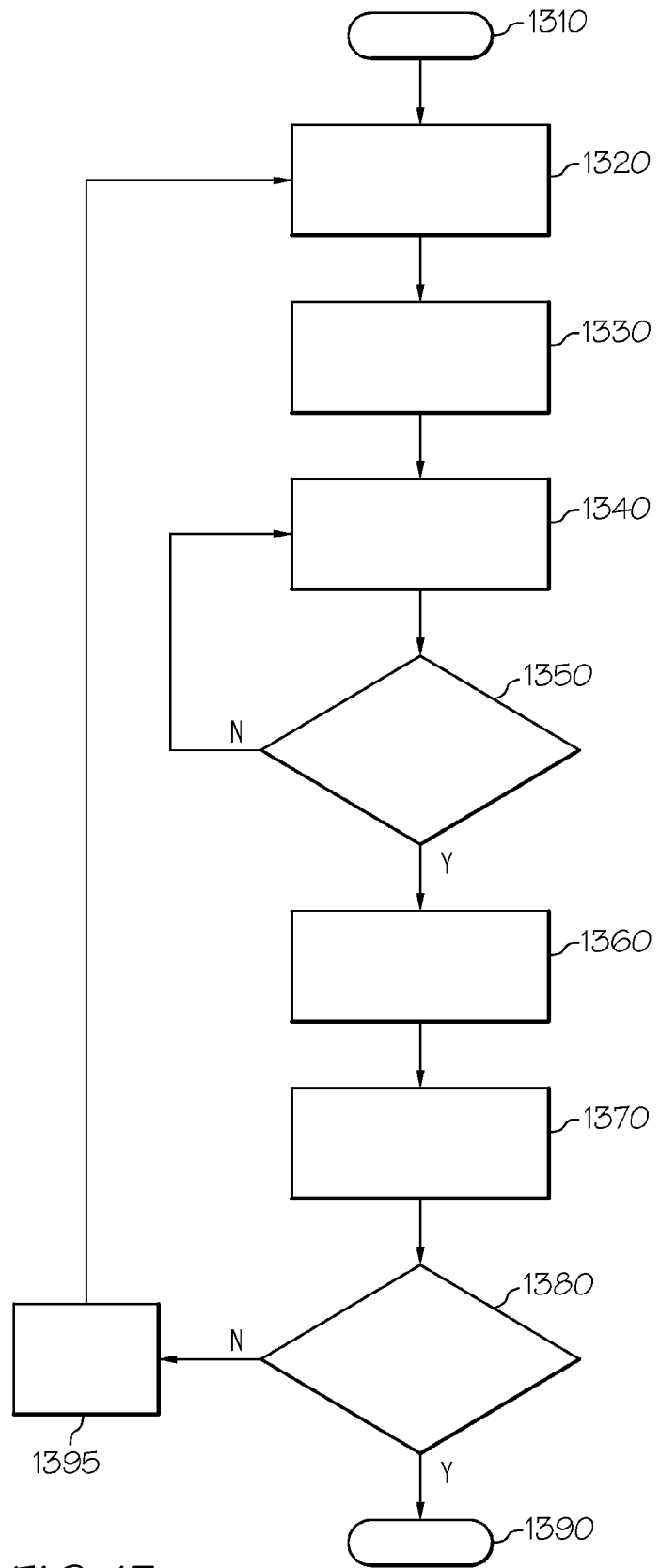
FIG. 13 is a flowchart illustration of a method of drying a ceramic article according to one or more embodiments shown and described herein.

Referring to the flowchart FIG. 13 as well as FIG. 1, a method of manufacturing a ceramic article 112 using the exemplary ceramic article manufacturing system illustrated in FIG. 1 will now be described in greater detail. After the ceramic article 112 is cut from the extrudate 104 (Block 1310), the ceramic article 112 passes from the second bearing system 114 onto a tray body 122 such that the ceramic article 112 is at least partially enclosed by the microwave coupling cover 124 (Block 1320). The microwave coupling cover 124 may be positioned on the tray body 122 by any appropriate method, such as manually or robotically. In embodiments wherein the microwave coupling cover is configured as a microwave coupling cover insert positioned within a tray body, such as the insert 224 and tray body 222 illustrated in FIGS. 3A-3B, for example, there may be no need to position the microwave cover onto the tray body.

After the ceramic article 112 is enclosed within the tray assembly 120, the conveyor system 130 transports the tray assembly 120 toward the microwave drying apparatus 132, which may have a plurality of microwave applicators and chambers (Block 1330). In one embodiment, the tray assemblies 120 are transported through the microwave drying apparatus 132 at a continuous rate. The ceramic article 112 then receives microwave energy in the microwave drying apparatus at Block 1340.

If the ceramic article is less than about 40% dry at Block 1350, the process follows the N path to return to Block 1340 so that the ceramic article may continue to receive microwave energy. Because the microwave cover 124 may only cover approximately a top or bottom half of the ceramic article 112, only the top or bottom portion of the ceramic article may receive the enhanced coupling benefits provided by the microwave cover 124. Therefore, when the ceramic article is between about 40% and about 60% dry at Block 1350, the process follows the Y path to Block 1360 where the ceramic article 112 may be rotated 180° around the axis of the ceramic article 112 such that the previously unexposed portion of the ceramic article 112 is now exposed to the enhanced coupling benefits provided by the microwave coupling cover 124. The ceramic article 112 may be rotated after a particular time within the microwave drying apparatus 132 based on historical data that indicates how long a particular type of ceramic article should be in the microwave drying apparatus 132 until it is approximately 40%-60% dry. In another embodiment, the dryness of the ceramic article 132 may be monitored by a sensor (not shown).

In embodiments wherein the microwave coupling cover 124 envelopes a top portion of the ceramic article 112, the ceramic article may be rotated by first disengaging the microwave coupling cover 124 from the tray body 122 to provide access to the ceramic article 112. The ceramic article 112 may then be rotated and the microwave coupling cover 124 placed once again on the tray body 122. The rotation of the ceramic article may 112 may be performed manually or robotically. In embodiments wherein the microwave coupling cover is configured as a microwave coupling insert (e.g., insert 224 of FIGS. 3A-3C) and envelopes the ceramic article from below a supporting surface, the ceramic article 112 may be rotated directly without requiring a removal of the microwave coupling insert. After the rotation, the ceramic material may be subjected to additional microwave radiation until a target dryness is achieved at Block 1360.

After the tray assembly 120 and the ceramic article 112 enclosed therein exits the microwave drying apparatus 132, the microwave coupling cover 124 may be removed from the tray assembly 120 (or not) and the ceramic article 112 may be removed from the tray body 122 at Block 1370. This process may be performed manually or robotically. The tray body 122 and microwave coupling cover 124 may be transported back to the beginning of the drying process (e.g., by one or more conveyor systems) to receive additional wet ceramic articles 112 (Block 1395) if the end of the extrudate 104 is not reached at Block 1380 (N path), or returned to an offline location (Block 1390) if the end of the extrudate is reached at Block 1380 (Y path).

Additional embodiments of tray assemblies having various configurations and methods for manufacturing ceramic articles associated therewith will now be described. Embodiments are not limited to the tray assembly configurations illustrated and described herein as variations and modifications may be utilized.

Figure 4A:
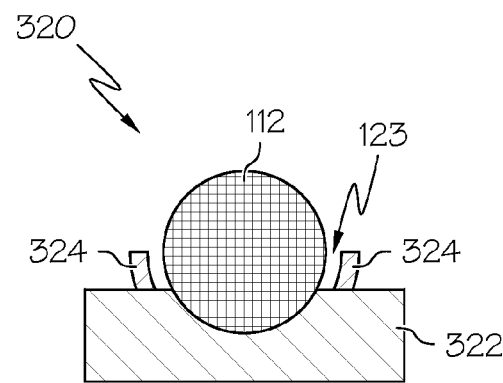
FIGS. 4A-4C are schematic illustrations of a front view, side view and perspective view, respectively, of an exemplary tray assembly and ceramic article according to one or more embodiments shown and described herein.
Figure 4B:
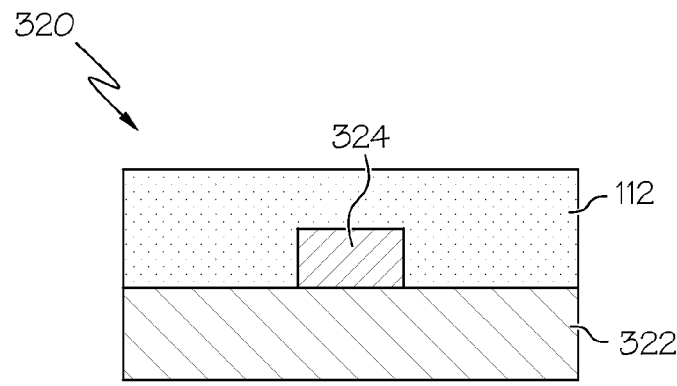
Figure 4C:
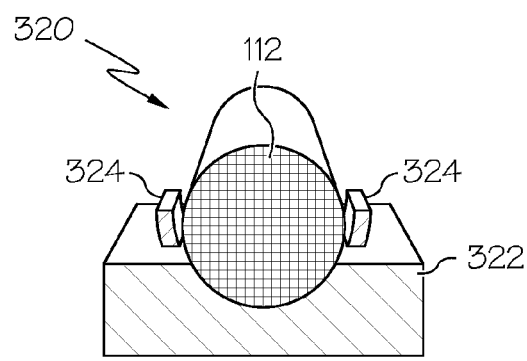

FIGS. 4A-4C illustrate an embodiment wherein the microwave coupling cover is configured as a microwave coupling insert 324 that is positioned within a tray body 322 and operable to cover at least a portion of a bottom half of the ceramic article 112. As described above with reference to FIGS. 3A-3C, the microwave coupling insert 324 may be integral with the tray body 322 or removable therefrom. The length of the microwave coupling 324 insert is shorter than the length of the microwave coupling insert illustrated in FIGS. 3A-3C.

To achieve optimal enhanced microwave energy coupling, the length of the microwave coupling insert 324 (or a top cover of embodiments described and illustrated herein)

should be greater than or equal to $\lambda_g$, which is the wavelength of the microwave radiation propagating within the ceramic article 112. For example, if the wavelength of the microwave radiation in the ceramic article is four inches, the length of the microwave coupling insert 324 should be greater than or equal to four inches. As described above, the thickness of the illustrated microwave coupling insert 324 is in some embodiments between about $\lambda_g/8$ and about $\lambda_g/2$, and the gap 123 about $\lambda_o/10$ to provide for optimal microwave coupling. Reducing the length of the microwave coupling insert or cover from a length that is the entire length of the ceramic article may provide the benefits of reducing the amount of material needed to manufacture the microwave coupling insert or cover as well as reducing the overall weight of the insert or cover.

Figure 5A:
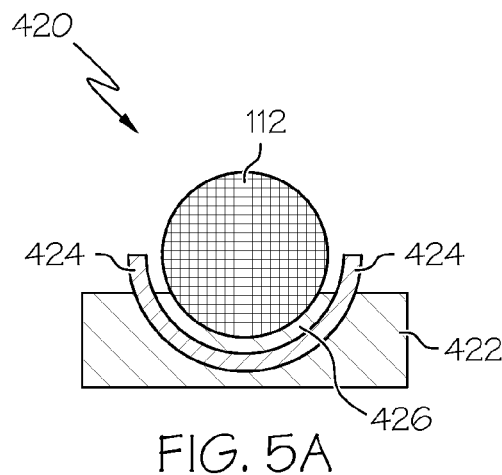
FIGS. 5A-5C are schematic illustrations of a front view, side view and perspective view, respectively, of an exemplary tray assembly and ceramic article according to one or more embodiments shown and described herein.
Figure 5B:
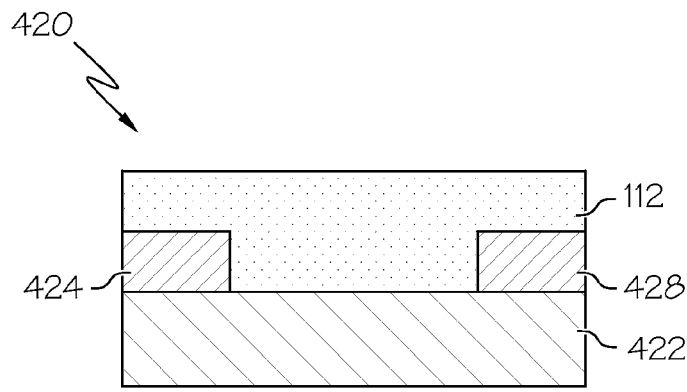
Figure 5C:
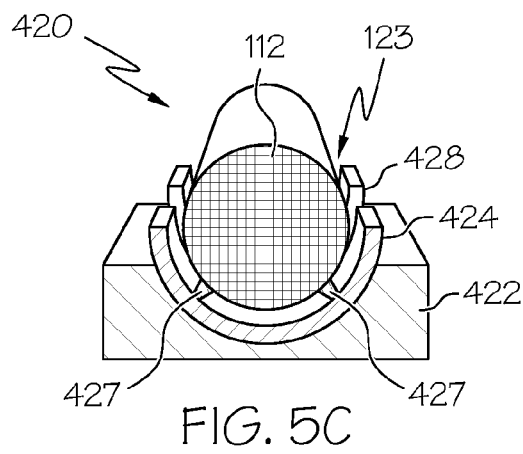

Referring now to FIGS. 5A-5C, a tray assembly 420 having two microwave coupling inserts is illustrated. A microwave coupling insert 424 (i.e., a first microwave coupling insert) may cover a first portion of the ceramic article 112 and an additional microwave coupling insert 428 (i.e., a second microwave coupling insert) may envelope a second portion of the ceramic article. The first and second portions are illustrated as proximate the first and second ends of the ceramic article 112. However, the microwave coupling covers 424, 428 may cover other portions of the ceramic article 112. The length of the first and second microwave coupling inserts 424, 428, which may be the same or different from one another, should be equal to or greater than λg as described above.

Figure 6A:
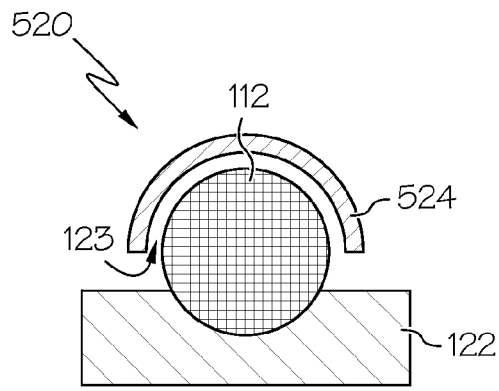
FIGS. 6A-6C are schematic illustrations of a front view, side view and perspective view, respectively, of an exemplary tray assembly and ceramic article according to one or more embodiments shown and described herein.
Figure 6B:
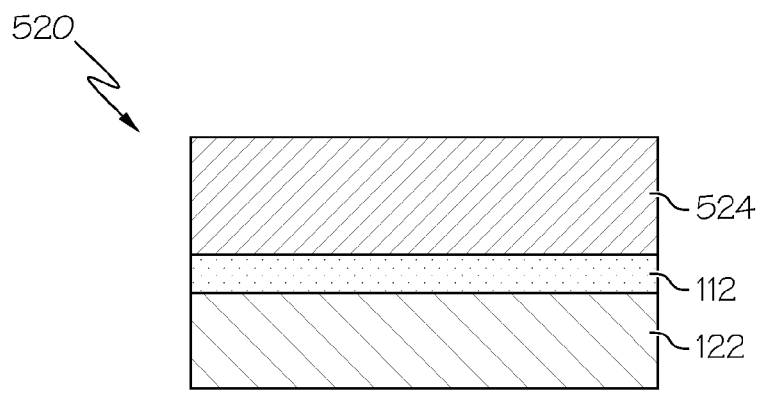
Figure 6C:
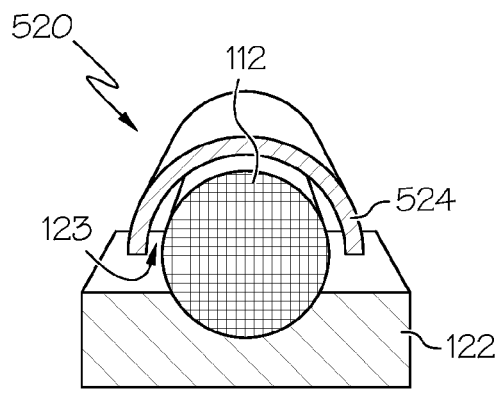

FIGS. 6A-6C illustrate an embodiment in which a tray assembly 520 having a microwave coupling cover 524 envelopes a ceramic article 112 from above. The microwave coupling cover 524 comprises a semi-cylindrical shape and is operable to cover an entire top half of the ceramic article 112. Although the illustrated microwave coupling cover 524 has a semi-cylindrical shape that substantially matches the contour of the ceramic article 112, embodiments are not limited thereto. The microwave coupling cover 524 may be supported by directly engaging the tray body 122 or indirectly supported by the use of optional microwave-transparent spacers (not shown) made of Lexan, Teflon, for example. As described above, the microwave coupling cover 524 illustrated in FIGS. 6A-6C may be removed from the tray body 122 when the ceramic article 112 is rotated and removed from the tray body 122 at the end of the drying process.

Figure 7A:
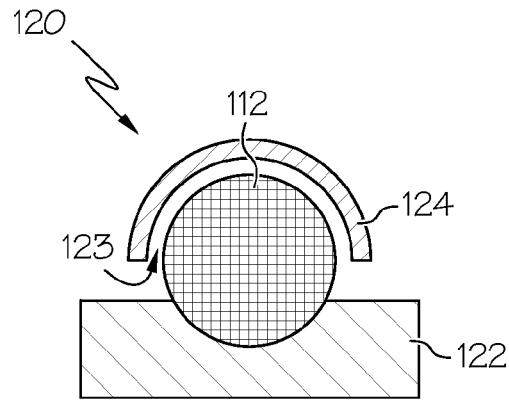
FIGS. 7A-7C are schematic illustrations of a front view, side view and perspective view, respectively, of an exemplary tray assembly and ceramic article according to one or more embodiments shown and described herein.
Figure 7B:
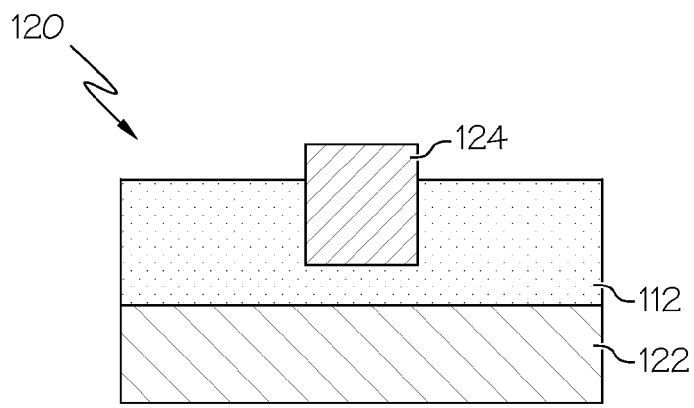
Figure 7C:
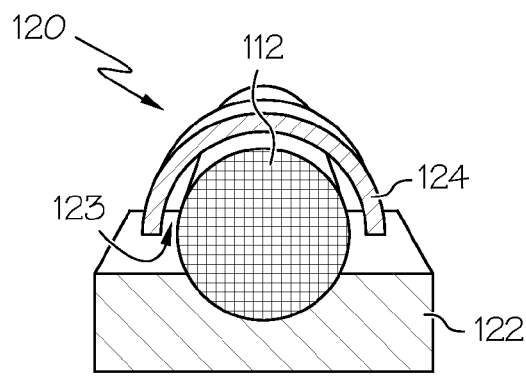

Referring now to FIGS. 7A-3C, a tray assembly 120 having a microwave coupling cover 124 that covers a portion of the length of the ceramic article 112 located on a tray body 122. FIGS. 7A-7C depict the embodiment illustrated in FIG. 2C. The length of the microwave coupling cover 124 illustrated in FIGS. 7A-7C is shorter than the length of the microwave coupling cover 524 illustrated in FIGS. 6A-6C. The microwave coupling cover 124 is operable to envelope at least a portion of a top half of the ceramic article 112. As described above with reference to FIGS. 4A-4C, the length of the microwave coupling cover 124 should be greater than or equal to $\lambda_g$ to provide optimal enhanced microwave energy coupling.

Figure 8A:
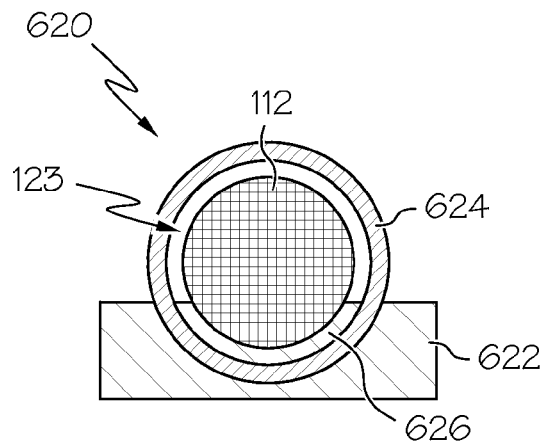
FIGS. 8A-8C are schematic illustrations of a front view, side view and perspective view, respectively, of an exemplary tray assembly and ceramic article according to one or more embodiments shown and described herein.
Figure 8B:
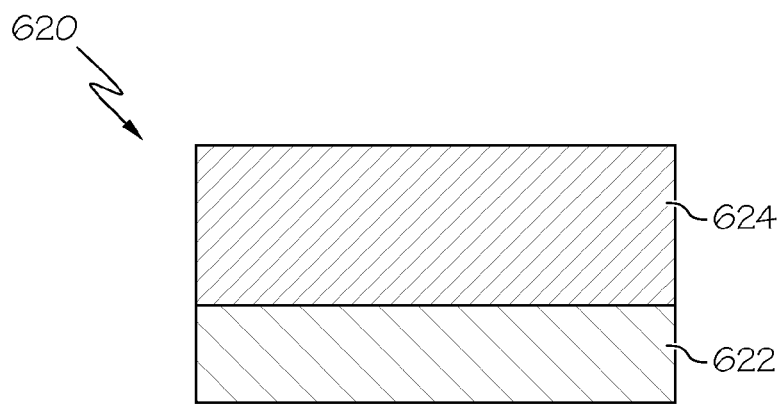
Figure 8C:
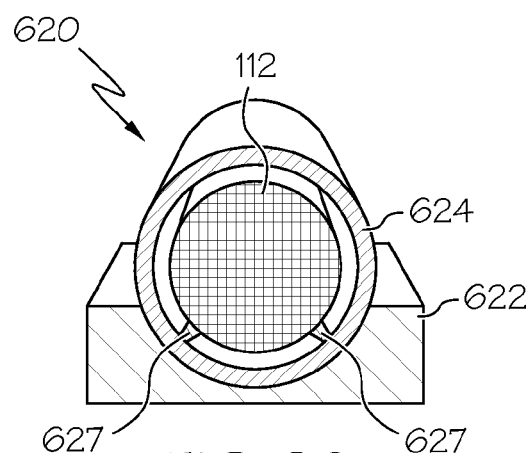

FIGS. 8A-8C illustrate an exemplary microwave tray assembly 620 having a cylindrical microwave coupling cover 624 that completely envelopes the entire length of the ceramic article 112. In another embodiment, the microwave coupling cover 624 may completely envelope only a portion of the ceramic article 112. The ceramic material 112 may be supported directly on a supporting surface 626 (FIG. 8A) or indirectly with the use of optional spacers 627 (FIG. 8C). The illustrated microwave coupling cover 624 may have the same properties as those microwave coupling covers described above. Microwave coupling covers that completely envelope the ceramic article may remove the step of rotating the ceramic article when the ceramic article is about 40%-60% dry because both the top and bottom half of the ceramic article is covered by the microwave coupling cover.

Figure 9A:
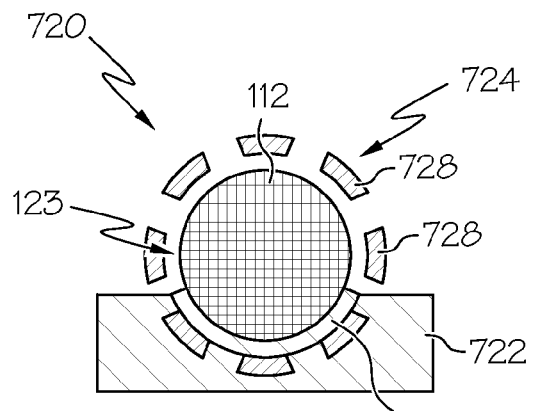
FIGS. 9A-9C are schematic illustrations of a front view, side view and perspective view, respectively, of an exemplary tray assembly and ceramic article according to one or more embodiments shown and described herein.
Figure 9B:
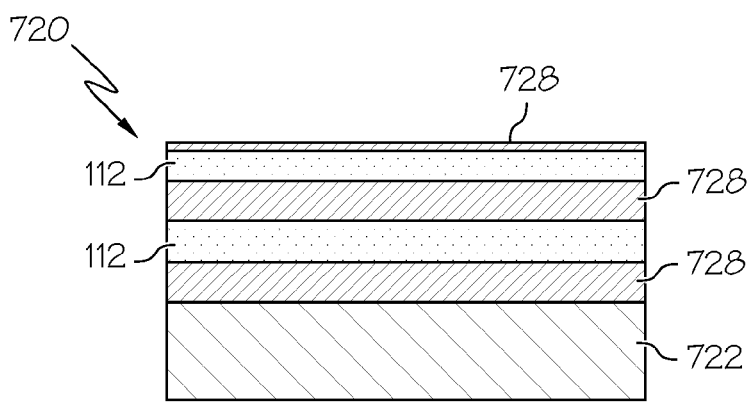
Figure 9C:
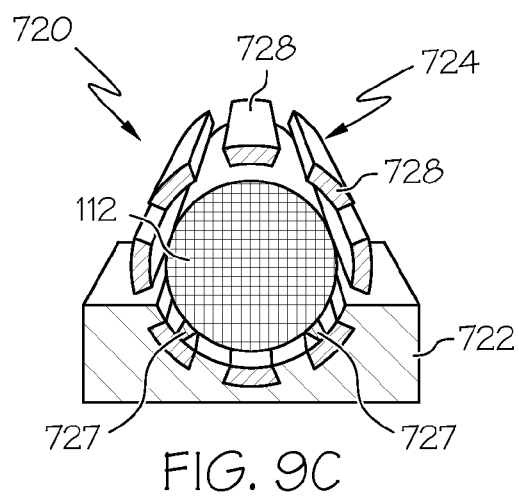

To enable a reduction of material and weight, as well as to increase air flow around the ceramic article 112 of a microwave coupling cover, the tray assembly 720 illustrated in FIGS. 9A-9C comprises a microwave coupling cover 724 having a plurality of axially extending coupler strips 728 made of a coupling material as described above. The coupler strips 728 may be arranged so that microwave coupling cover 724 completely envelopes at least a portion of the ceramic article 112. The ceramic article 112 may be supported directly on a supporting surface 726 (FIG. 9A) or indirectly with the use of optional spacers 727 (FIG. 9C). The coupler strips 728 may be maintained with connectors (not shown) that may be transparent of microwave radiation to achieve a microwave coupling cover having a desired shape. A ceramic article dried using the tray assembly 720 illustrated in FIGS. 9A-9C may need a slight rotation when the ceramic article is about 40%-60% dry. This may be achieved by gripping the ends of the ceramic article and providing the slight rotation, or by slightly rotating the microwave coupling cover 724. The coupler strips may also be utilized in an embodiment that covers a top or a bottom of the ceramic article.

Figure 10A:
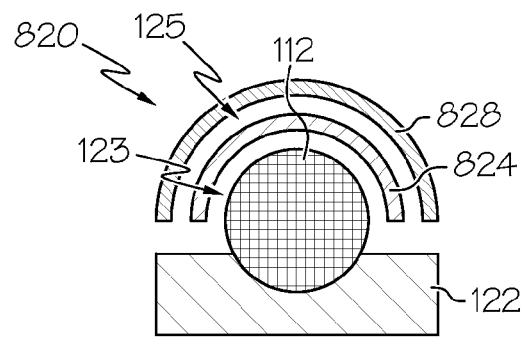
FIGS. 10A-10C are schematic illustrations of a front view, side view and perspective view, respectively, of an exemplary tray assembly and ceramic article according to one or more embodiments shown and described herein.
Figure 10B:
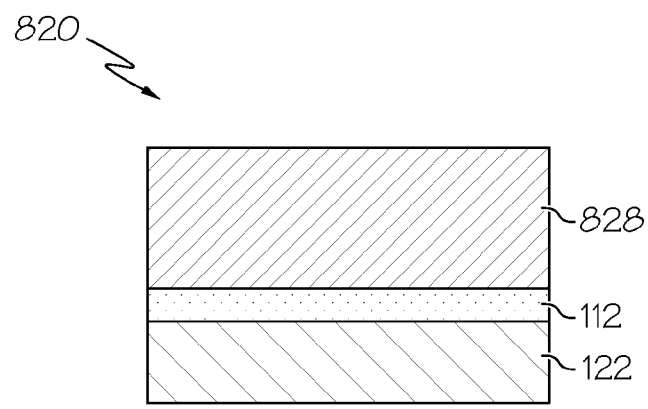
Figure 10C:
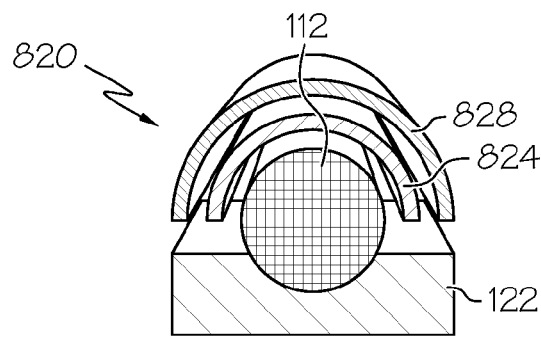

Now referring to FIGS. 10A-10C, a tray assembly 820 having a microwave coupling cover configured as an inner cover 824 and an additional coupling cover configured as an outer cover 828 is illustrated. The illustrated successive covers 824, 828 are separated by a gap 125 of less than about $\lambda_o/10$ to allow air flow and prevent condensation on the respective covers 824, 828. However, the inner cover 824 and outer cover 828 may be positioned on the tray body 122 such that they contact one another. As described above regarding FIGS. 2A-2C, the successive covers 824, 828 may be directly or indirectly supported by the tray body 122. The inner and outer covers 824, 828 may be made of different coupling materials, or similar materials having different porosities and dielectric properties, and may be selected to increase the coupling of microwave energy into the ceramic article 112, as described above with reference to FIG. 2D.

Figure 11A:
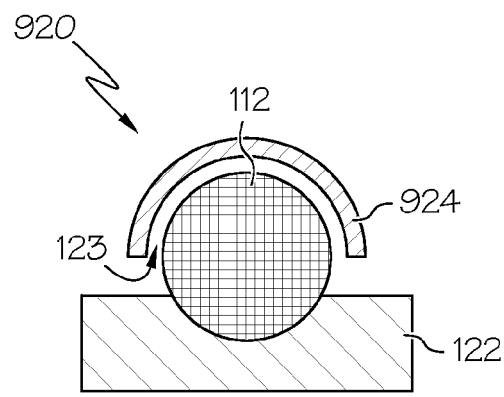
FIGS. 11A-11C are schematic illustrations of a front view, side view and perspective view, respectively, of an exemplary tray assembly and ceramic article according to one or more embodiments shown and described herein.
Figure 11B:
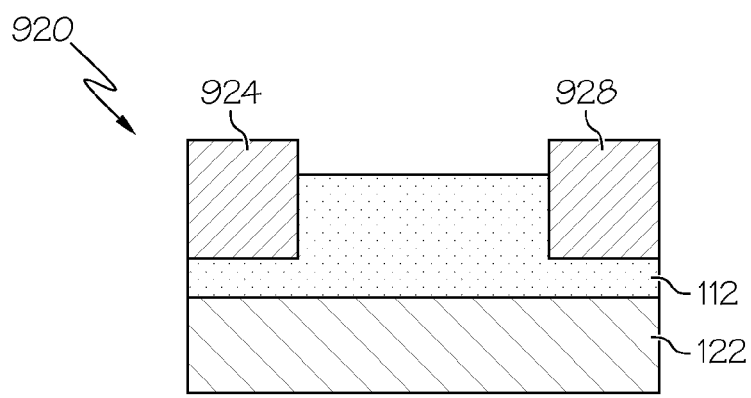
Figure 11C:
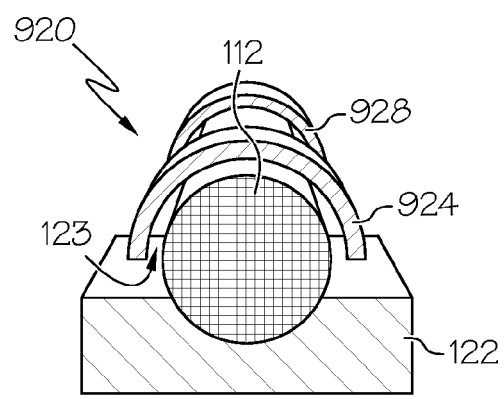

FIGS. 11A-11C also illustrates a tray assembly 920 having two microwave coupling covers. A microwave coupling cover 924 (i.e., a first microwave coupling cover) may envelope a first portion of the ceramic article 112 and an additional microwave coupling cover 928 (i.e., a second microwave coupling cover) may envelope a second portion of the ceramic article. The first and second portions are illustrated as proximate the first and second ends of the ceramic article 112. However, as described above with reference to the microwave coupling inserts 424, 428 illustrated in FIGS. 5A-5C, the microwave coupling covers 924, 928 may cover other portions of the ceramic article 112. The length of the first and second microwave coupling covers 924, 928, which may be the same or different from one another, should be equal to or greater than λg as described above. As described above, the first and second microwave coupling covers 924, 928 may be directly or indirectly supported by the tray body 122.

The tray assemblies and methods described herein are particularly suitable for drying ceramic articles such as ceramic honeycomb structures, for example. Drying, as used herein, refers to a reduction in the liquid content of the ceramic article to a target dryness value. Embodiments described herein may provide enhanced microwave coupling into the ceramic article by the use of one or more microwave coupling covers that aid in impedance matching between air and the ceramic article. Embodiments may improve the quality of dried ceramic materials by reducing or eliminating the formation of wet and/or hot spots within the ceramic article. Further, embodiments may reduce both the time the ceramic article needs to be in a microwave drying apparatus and the amount of microwave energy needed to completely dry the ceramic article or to attain the target dryness.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A method of manufacturing a ceramic article, comprising:
    extruding a wet ceramic material with an extruder apparatus;
    cutting the extruded wet ceramic material to form a ceramic article;
    placing the ceramic article onto a tray body, the tray assembly body associated with a microwave coupling cover configured to cover at least a portion of the ceramic article;
    conveying the ceramic article on the tray body along a conveyor travel axis;
    subjecting the ceramic article to microwave radiation through at least the microwave coupling cover, wherein the microwave coupling cover has a dielectric property such that a greater percentage of microwave energy is coupled into the ceramic article with the microwave coupling cover present than with the microwave coupling cover not present;
    removing the ceramic article from the tray body when the ceramic article is at a target dryness; and
    returning the tray body and microwave coupling cover to the extruder apparatus.

2. The method as claimed in claim 1, wherein:
    the tray body further comprises a tray body longitudinal axis, the conveyor travel axis normal to the tray body longitudinal axis, and a channel disposed within a surface of the tray body parallel to the tray body longitudinal axis;
    placing the ceramic article onto the tray body further comprises placing the ceramic article onto the channel such that a ceramic article longitudinal axis is substantially parallel to the tray body longitudinal axis; and
    the microwave coupling cover comprises a coupler longitudinal axis that is common with the ceramic article longitudinal axis.

3. The method as claimed in claim 1, wherein the dielectric property of the microwave coupling cover is approximately equal to $$\frac{\varepsilon_O + \varepsilon_{R2D}}{2},$$

where $\in_O$ is a dielectric property of air and $\in_{R2D}$ is a dielectric property of a dried ceramic article.

4. The method as claimed in claim 1, wherein the microwave coupling cover envelopes at least a portion of a first half of the ceramic article, and the method further comprises:
    rotating the microwave coupling cover or the ceramic article when the ceramic article is between 40% and 60% dry such that the microwave coupling cover envelopes at least a portion of a second half of the ceramic article; and
    continuing to subject the ceramic article to microwave radiation until the ceramic article is at the target dryness.

5. The method as claimed in claim 1, wherein the microwave coupling cover has a length that is greater than about $\lambda_g$ and a thickness between about $\lambda_g/8$ and about $\lambda_g/2$, where $\lambda_g$ is the wavelength of microwave radiation propagating in the ceramic article.

6. A method of manufacturing a ceramic article, comprising:
    extruding a wet ceramic material with an extruder apparatus;
    cutting the extruded wet ceramic material to form a ceramic article;
    placing the ceramic article onto a supporting surface of a tray body, the tray assembly body associated with a microwave coupling insert disposed below the supporting surface of the tray body configured to surround at least a portion of the ceramic article;
    subjecting the ceramic article to microwave radiation through at least the microwave coupling insert, wherein the microwave coupling insert has a dielectric property such that a greater percentage of microwave energy is coupled into the ceramic article with the microwave coupling insert present than with the microwave coupling insert not present;
    removing the ceramic article from the tray body when the ceramic article is at a target dryness.

7. The method as claimed in claim 6, wherein:
    the tray body further comprises a tray body longitudinal axis, a conveyor travel axis that is normal to the tray body longitudinal axis, and a channel disposed within a surface of the tray body parallel to the tray body longitudinal axis;
    placing the ceramic article onto the tray body further comprises placing the ceramic article onto the channel such that a ceramic article longitudinal axis is substantially parallel to the tray body longitudinal axis; and
    the microwave coupling insert comprises a coupler longitudinal axis that is common with the ceramic article longitudinal axis.

8. The method as claimed in claim 6, wherein the dielectric property of the microwave coupling insert is approximately equal to $$\frac{\varepsilon_O + \varepsilon_{R2D}}{2},$$

where $\in_O$ is a dielectric property of air and $\in_{R2D}$ is a dielectric property of a dried ceramic article.

9. The method as claimed in claim 6, wherein the microwave coupling insert has a length that is equal to or greater than about $\lambda_g$ and a thickness of between about $\lambda_g/8$ and about $\lambda_g/2$, where $\lambda_g$ is the wavelength of the microwave radiation propagating in the ceramic article, the microwave radiation emitted by one or more microwave sources of a microwave drying apparatus.

10. The method as claimed in claim 6, further comprising removing the coupling insert from the tray assembly.

* * * * *